(12) United States Patent
Li et al.

(10) Patent No.: US 9,866,807 B2
(45) Date of Patent: Jan. 9, 2018

(54) LIGHT SOURCE SYSTEM AND IMAGE PROJECTION SYSTEM

(71) Applicant: Appotronics Corporation Limited, Shenzhen (CN)

(72) Inventors: Yi Li, Pleasanton, CA (US); Liangliang Cao, Shenzhen (CN); Yi Yang, Shenzhen (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 178 days.

(21) Appl. No.: 13/644,144

(22) Filed: Oct. 3, 2012

(65) Prior Publication Data

US 2013/0271954 A1 Oct. 17, 2013

Related U.S. Application Data

(60) Provisional application No. 61/542,741, filed on Oct. 3, 2011.

(51) Int. Cl.
*G03B 21/00* (2006.01)
*H04N 9/31* (2006.01)
(Continued)

(52) U.S. Cl.
CPC ............. *H04N 9/3155* (2013.01); *F21V 9/10* (2013.01); *G03B 11/00* (2013.01); *G03B 21/204* (2013.01);
(Continued)

(58) Field of Classification Search
CPC ........ G03B 21/00; G03B 21/14; G03B 21/56; H04N 9/3155; H04N 9/3197
(Continued)

(56) References Cited

U.S. PATENT DOCUMENTS 4,217,040 A * 8/1980 Longerbeam .................. 353/46
2002/0109821 A1 8/2002 Huibers
(Continued)

FOREIGN PATENT DOCUMENTS

CN 1488986 A 4/2004
CN 1512260 A 7/2004
(Continued)

OTHER PUBLICATIONS

Chinese Office Action, dated Jun. 4, 2014, in a counterpart Chinese patent application, No. CN 201110424486.8.
(Continued)

*Primary Examiner* — Sultan Chowdhury
(74) *Attorney, Agent, or Firm* — Chen Yoshimura LLP

(57) ABSTRACT

A light source system using an excitation light source and a multi-segmented color wheel device with wavelength conversion materials is disclosed. The color wheel device includes a first area having two or more first segments and a second area having two or more second segments for receiving the excitation light. The color wheel device is driven by the driving device periodically, so that a first light sequence is generated by the two or more first segments in the first working mode and a second light sequence is generated by the two or more second segments in the second working mode. The first light sequence is different from the second light sequence. The first and second working modes are switched by a switching device. The light source system may be used in image projection system generating two or more different lights sequences in different working modes.

17 Claims, 11 Drawing Sheets

(51) Int. Cl.
| | |
|---|---|
| *F21V 9/10* | (2006.01) |
| *G03B 11/00* | (2006.01) |
| *G03B 21/20* | (2006.01) |
| *G03B 33/08* | (2006.01) |
| *G03B 35/26* | (2006.01) |
| *F21V 13/08* | (2006.01) |
| *F21S 10/00* | (2006.01) |
| *F21W 131/406* | (2006.01) |

(52) U.S. Cl.
CPC ............. *G03B 33/08* (2013.01); *G03B 35/26* (2013.01); *H04N 9/3114* (2013.01); *F21S 10/007* (2013.01); *F21V 13/08* (2013.01); *F21W 2131/406* (2013.01)

(58) Field of Classification Search
USPC ................ 353/7, 30, 31, 84, 85, 94; 362/84, 362/217.08, 217.09; 349/5, 7–9; 348/739, 742–747, 758
See application file for complete search history.

(56) References Cited

U.S. PATENT DOCUMENTS

| | | | |
|---|---|---|---|
| 2004/0036668 A1* | 2/2004 | Nakanishi | 345/88 |
| 2005/0275806 A1* | 12/2005 | Roth | 353/20 |
| 2005/0280785 A1* | 12/2005 | Beeson et al. | 353/97 |
| 2007/0052638 A1* | 3/2007 | May et al. | 345/84 |
| 2008/0239068 A1 | 10/2008 | Lipton | |
| 2009/0034284 A1* | 2/2009 | Li et al. | 362/554 |
| 2010/0079730 A1* | 4/2010 | Shibasaki | 353/31 |
| 2010/0149496 A1* | 6/2010 | Inoue | 353/98 |
| 2011/0043765 A1 | 2/2011 | Shibasaki | |
| 2012/0068630 A1 | 3/2012 | Li et al. | |
| 2012/0320109 A1 | 12/2012 | Shibasaki | |

FOREIGN PATENT DOCUMENTS

| | | |
|---|---|---|
| CN | 1719333 A | 1/2006 |
| CN | 101126889 A | 2/2008 |
| CN | 101893204 A | 11/2010 |
| CN | 101995750 A | 3/2011 |
| JP | 2003-167297 A | 6/2003 |
| WO | 2008/123944 A1 | 10/2008 |

OTHER PUBLICATIONS

Chinese Office Action, dated Feb. 4, 2015, in a counterpart Chinese patent application, No. CN 201110424486.8.

Chinese Office Action, dated Aug. 12, 2015, in a counterpart Chinese patent application, No. CN 201110424486.8.

* cited by examiner ially explanatory and intended to provide further explanation of the invention as claimed.

LIGHT SOURCE SYSTEM AND IMAGE PROJECTION SYSTEM

This application claims priority under 35 USC §119(e) from U.S. Provisional Patent Application No. 61/542,741, filed Oct. 3, 2011, which is herein incorporated by reference in its entirety.

BACKGROUND OF THE INVENTION

1. Field of the Invention

The present invention generally relates to light source system and image projection system based on wavelength conversion.

2. Description of the Related Art

Multi-color light sequences are often used in stage lighting and image projection display. FIG. 1 shows a conventional system for generating a multi-color light sequence. As shown in FIG. 1, an excitation light 12 from a light source 11 is focused on a color wheel 14 by focusing optics 13. The color wheel 14 includes several segments, which carries different fluorescent materials to convert excitation light to converted light. When the color wheel 14 rotates around the rotation axis 16, driven by driving device 13, these different segments can be exposed in the optical path of the excitation light in turn to generate of multi-color converted light sequence. For example, as shown in FIG. 2, the color wheel 14 including red segment R, green segment G, blue segment B and white segment W can be excited by excitation light 12 and generate a red-green-blue-white color light sequence.

The red-blue-green-white light sequence generated by color wheel 14 shown in FIG. 2 can be applied in the field of white light enhancement: the red, blue and green lights are used to generate color images, while the white light can be used to improve the brightness when data and diagrams are shown. However the above-mentioned light source system has poor unsatisfactory saturation. In other display applications, such as dynamic video display, color saturation of picture is much more important than brightness, so a red-green-blue light sequence without white light is more proper in this situation. Further, two different multi-color light sequences are needed in some stereo projectors, one is for 2D projection display and the other is for 3D projection display. Conventional light source systems and projection devices typically do not provide two different light sequences according to the different working modes.

Therefore a light source system and image projection system are needed to solve the above-mentioned problems.

SUMMARY OF THE INVENTION

The present invention is directed to a light source system for generating multicolor light using wavelength conversion materials. The light source system may be used for image projection system.

An object of the present invention is to provide a light source system which can generate two or more lights sequences according to different working modes.

Additional features and advantages of the invention will be set forth in the descriptions that follow and in part will be apparent from the description, or may be learned by practice of the invention. The objectives and other advantages for the invention will be realized and attained by the structure particularly pointed out in the written description and claims thereof as well as the appended drawing.

To achieve these and other advantages and in accordance with the purpose of the present invention, as embodied and broadly described, the present invention provides a light source system for providing two or more light sequences according to different working modes, which includes an excitation light source for generating an excitation light; a color wheel device for absorbing the excitation light and emitting light having wavelength different from that of the excitation light; a driving device and a switching device. The color wheel includes a first area and a second area. The first area includes two or more first segments and the second area includes two or more second segments. The driving device drives the color wheel device to move periodically so that the first light sequence is generated by the two or more first segments which periodically emit the first light sequentially in the first working mode of the light source system and the second light sequence is generated by the two or more second segments which periodically emit the second light sequentially in the second working mode of the light source system, the first light sequence being different from the second light sequence. The switching device is used to control the switching of the working mode of the light source system between the first working mode and the second working mode.

It is to be understood that both the foregoing general description and the following detailed description are exemplary and explanatory and intended to provide further explanation of the invention as claimed.

DETAILED DESCRIPTION OF THE PREFERRED EMBODIMENTS

Figure 1:
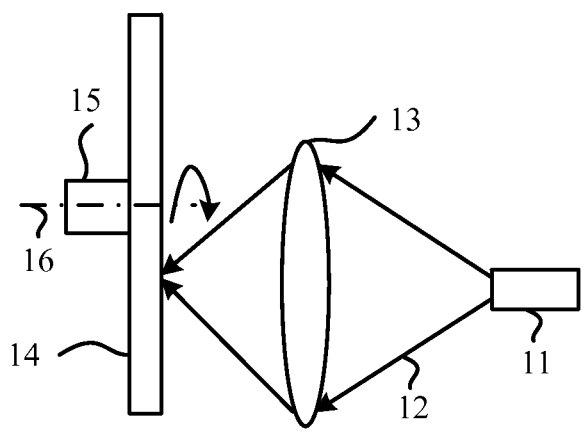
FIG. 1 illustrates a prior art light source system.
Figure 2:
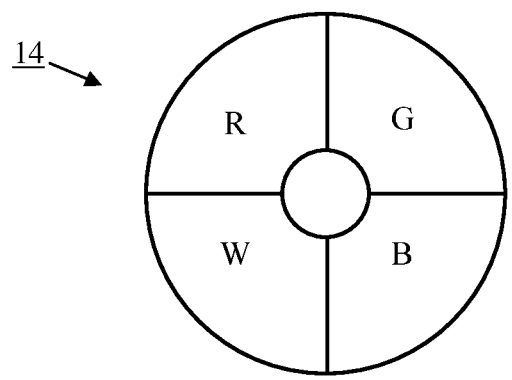
FIG. 2 illustrates the structure of color wheel used in the light source system shown in FIG. 1.
Figure 3:
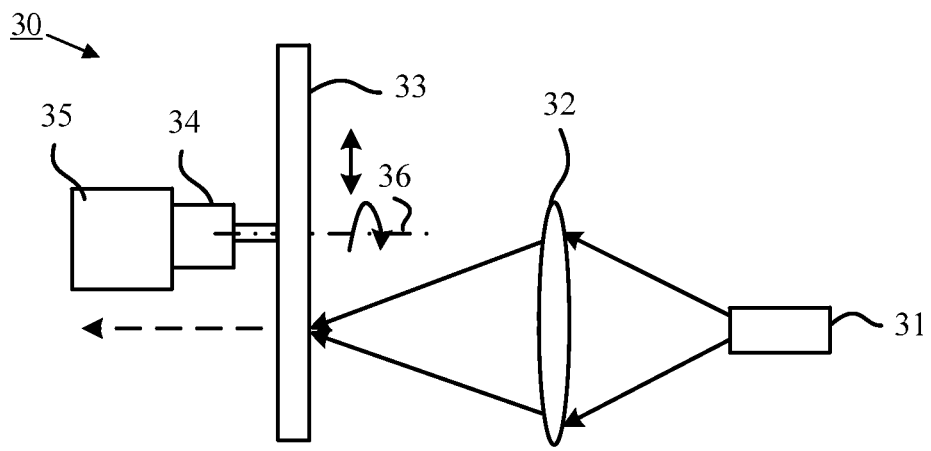
FIG. 3 illustrates a light source system according to a first embodiment of the present invention.

FIG. 3 illustrates a light source system according to a first embodiment of the present invention. As shown in FIG. 3, the light source system includes an excitation light source 31, a focusing optics 32, a moving color device 33 carrying wavelength conversion materials and/or color filters (referred to as a color wheel here), a driving device 34 and a switching device 35.

In this embodiment, the excitation light from the light source 31 is collected by focusing optics 32 and then impinges on the color wheel 33. The excitation light is absorbed by the wavelength conversion materials on the color wheel 33 and converted to converted lights. The color wheel 33 is driven by driving device 34 to rotate around the rotation axis 36. The switching device 35 is capable of moving the color wheel 33 and the driving device 34 along a direction perpendicular to the rotation axis 36, as shown by the double arrows in FIG. 3.

Figure 4:
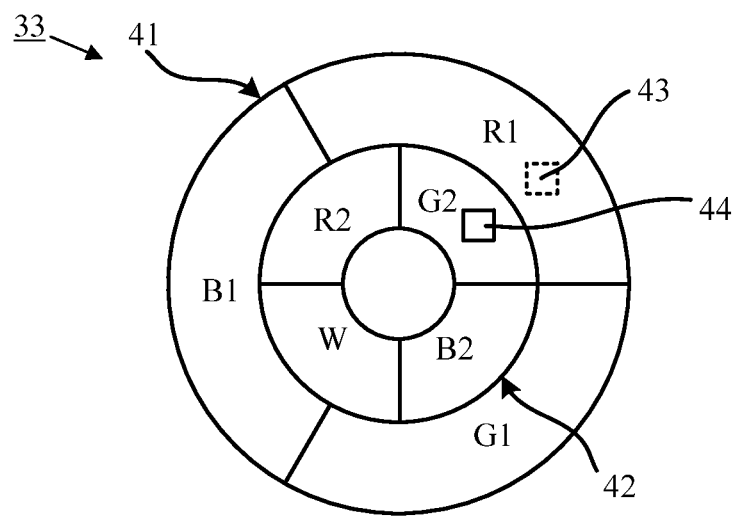
FIG. 4 illustrates the structure of a color wheel useful in the light source system shown in FIG. 3.

FIG. 4 illustrates the structure of the color wheel 33 used in the light source system shown in FIG. 3. As shown is FIG. 4, the color wheel 33 includes a first area 41 and a second area 42. The first area 41 is a ring-shaped area, which includes a red segment R1, a green segment G1, and a blue segment B1 arranged along the circumferential direction. These three segments absorb the excitation light from the light source 31 and generate red, green and blue lights, respectively, which will be transmitted through the color wheel 33. The second area 42 is a ring-shaped area concentric with the first area 41, and includes a red segment R2, a green segment G2, a blue segment B2, and a white segment W arranged along the circumferential direction. These four segments absorb the excitation light from the light source 31 and generate red, green, blue and white lights, respectively, which will be transmitted through the color wheel 33. The first area 41 and the second area 42 rotate around the rotation axis 36 as the color wheel 33 rotates.

In the embodiment shown in FIG. 4, the moving color device 33 is wheel-shaped with two concentric rings constituting the first and second areas. In an alternative embodiment, the moving color device has a linear band shape, with two parallel stripes constituting the first and second areas, and oscillates lineally along the horizontal direction as driven by a driving device 34. In another embodiment, the moving color device has a cylindrical shape, with two cylindrical shaped bands constituting the first and second areas, and rotates as driven by a driving device 34. The moving color device may have other shapes, and the shapes of the first area 41 and the second area 42 should be designed according to the shape of the moving color device. The other color wheels shown and described later in this disclosure (FIGS. 5, 6, 12, 13, 16, 17, 20, and 21) may have similar alternative structures.

In the light source system shown in FIG. 3, the switch device 35 moves the color wheel 33 and the driving device 34 along a direction perpendicular to the rotation axis 36. In an alternative embodiment, the switching device moves the excitation light source along a direction perpendicular to the rotation axis 36 to achieve the same result of switching between the first and second working modes. This alternative structure can be applied to the other embodiments described later. More generally, in various embodiments of the present invention, the switching of working mode is achieved by moving the color wheel and the excitation light source relative to each other.

If the excitation light from the light source 31 is a UV light or near UV light, the red segment R1 and R2 may contain a red wavelength conversion material, the green segment G1 and G2 may contain a green wavelength conversion material, the blue segment B1 and B2 may contain a blue wavelength material, and the white segment W may contain a mixture of different wavelength conversion materials, such as a blue wavelength conversion material and a yellow wavelength conversion material. All segments can be excited by excitation light from light source 31 and emit lights with respective colors. If the excitation light from light source 31 is a blue light, the blue segment B1 and B2 may be clear segments that transmit the blue light without wavelength conversion, and the white segment W may include a yellow wavelength conversion material which converts a part of the blue excitation light into a yellow light to produce a white light as a combination of the remaining blue excitation light and the converted yellow light. In addition, the various segments may also be filter segments without wavelength conversion material, and the light from the light source 31 is a white light. The various segments of the other color wheels shown and described later in this disclosure (FIGS. 5, 6, 12, 13, 16, 17, 20, and 21) may have similar constructions unless otherwise specified.

In a first working mode of the light source system 30, the switching device 35 adjusts the color wheel 33 and the driving device 34 to a proper position in the direction perpendicular to the rotation axis 36, so that the excitation light from the light source 31 impinges on the first area to form the light spot 43. When the color wheel 33 rotates around its rotation axis 36 as driven by the driving device 34, the different segments R1, G1, B1 in the first area are exposed to the excitation light at different times, and lights of different colors are generated sequentially. As a result, the first light sequence of red, blue and green lights is emitted by light source system 30. In a second working mode of the light source system 30, the switching device 35 adjusts the color wheel 33 and driving device 34 to another proper position in the direction perpendicular to rotation axis 36, so that the excitation light from the light source 31 impinges on the second area 42 to form the light spot 44. When the color wheel 33 rotates around its rotation axis 36 as driven by the driving device 34, the different segments R2, G2, B2, W in the second area 42 are exposed to the excitation light at different times, and lights of different colors are generated sequentially. As a result, the second light sequence of red, blue, green and white lights is generated by light source system 30.

Figure 5:
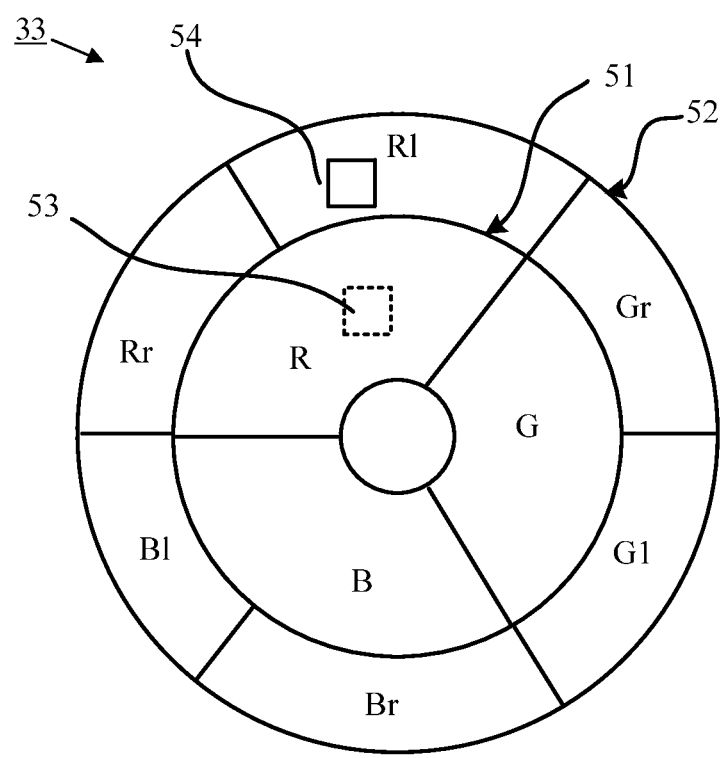
FIG. 5 illustrates a second example of the color wheel useful in the light source system shown in FIG. 3.

FIG. 5 illustrates a second example of the color wheel 33 of this invention. As shown in FIG. 5, the color wheel 33 includes a first area 51 and a second area 52. The first area 51 contains red segment R, green segment G and blue segment B, which may be excited by the excitation light to generate red, green and blue lights, respectively. The second area 52 contains a red segment Rr for the right eye, a red segment Rl for the left eye, a green segment Gr for the right eye, a green segment Gl for the left eye, a blue segments Br for the right eye, and a blue segment Bl for the left eye, which may be excited by the excitation light and to generate a red light for the right eye, a red light for the left eye, a green light for the right eye, a green light for the left eye, a blue light for the right eye, and a blue light for the right eye, respectively. The red light for the right eye, the red light for the left eye, the green light for the right eye, the green light for the left eye, the blue light for the right eye, the blue light for the left eye refer to the red light, green light and blue light that can be distinguished by a proper way in the 3D display and may be used to carry color images for the right eye and the left eye, respectively. They may be obtained in several ways.

The first way is to provide different wavelength conversion materials that can generate the same color lights with different dominant wavelengths in the same color segments for right and left eyes. For example, a red wavelength conversion material that generates light with a dominant wavelength of 630 nm is provided in the red segment Rr for the right eye, and another red wavelength conversion material that generates light with a dominant wavelength of 650 nm is provided in the red segment Rl for the left eye. As a result, the red segment Rr for the right eye is excited by excitation light from the light source 31 and generates a light with a dominant wavelength of 630 nm, while the red segment Rl for the left eye is excited by the excitation light from light source 31 and generates a light with a dominant wavelength of 650 nm. These two red lights may be separated by a dichroic filter downstream of the color wheel.

The second way is to provide the same wavelength conversion materials in the same color segments for the right and left eyes, and to obtain lights of the same color but different dominant wavelengths using different dichroic filters to filter the lights from the wavelength conversion materials. For example, a red conversion material that can generate light with a main wavelength in the range of 630 nm to 650 nm is provided in the red segment Rr for the right eye and the red segment Rl for the left eye, and a dichroic filter that can transmit red light having a main wavelength of 630 nm is provided in the red segment Rr for the right eye, while the dichroic filter that can transmit red light having a main wavelength of 650 nm is provided in the red segment Rl for the left eye. Of course, when the segments for the right eye and the left eye are segments that transmit the excitation light (e.g. the blue segments), different dichroic filters can be provided in those segments without any wavelength conversion materials.

The third way is to arrange different polarizers in segments of same color for the right eye and the left eye to generate lights with different polarization states, which may be separated by polarizers downstream of the color wheel.

In a first working mode of the light source 30 using the color wheel shown in FIG. 5, the switching device 35 adjusts the color wheel 33 and the driving device 34 to a proper position in the direction perpendicular to rotation axis 36, so that the excitation light from the light source 31 impinges on the first area 51 to form the light spot 53. When the color wheel 33 rotates around its rotation axis 36 as driven by the driving device 34, the different segments R, G, B in the first area are exposed to the excitation light at different times, and lights of different colors are generated sequentially. As a result, the first light sequence of red, blue and green lights is emitted by light source system 30. In a second working mode of the light source system 30 using the color wheel shown in FIG. 5, the switching device 35 adjusts the color wheel 33 and the driving device 34 to another proper position in the direction perpendicular to rotation axis 36, so that the excitation light from the light source 31 impinges on the second area 52 to form the light spot 54. When the color wheel 33 rotates around its rotation axis 36 as driven by the driving device 34, the red segment Rr for the right eye, the red segment Rl for the left eye, the green segment Gr for the right eye, the green segment Gl for the left eye, the blue segment Br for the right eye, and the blue segment Bl for the left eye in the second area 52 are exposed to the excitation light at different times, and the lights with a red light for the right eye, a red light for the left eye, a green light for the right eye, a green light for the left eye, a blue light for the right eye, and a blue light for the left eye are generated sequentially. As a result, the second light sequence for the right eye and the left eye is emitted by light source system 30.

Figure 6:
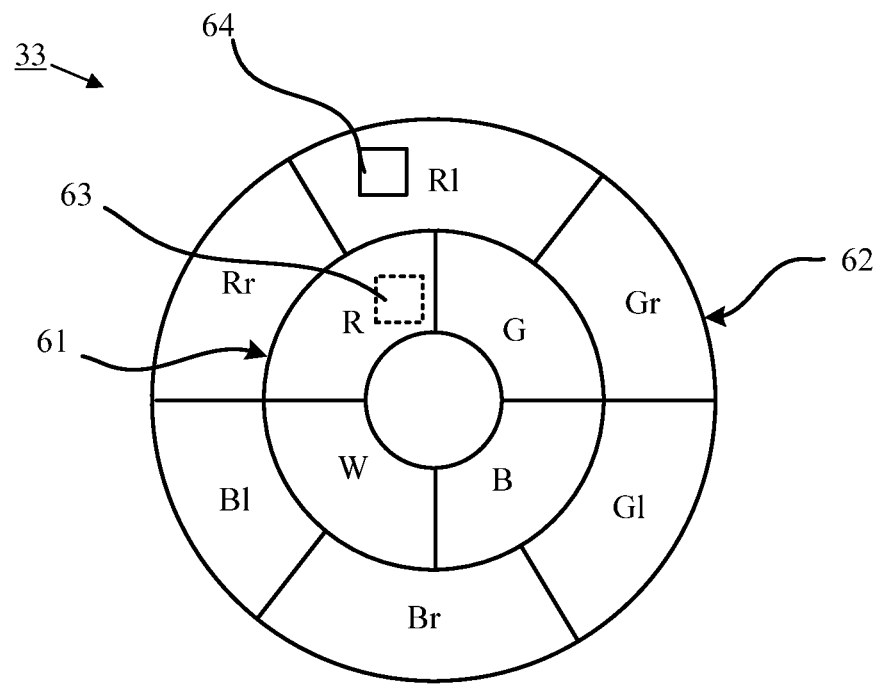
FIG. 6 illustrates a third example of the color wheel useful in the light source system shown in FIG. 3 of this invention.

FIG. 6 illustrates a third example of the color wheel shown in FIG. 3. The color wheel 33 includes a first area 61 and a second area 62. The first area 61 is configured to have a red segment R, a green segment G, a blue segment B, and a white segment W; the second area 62 is configured to have a red segment Rr for the right eye, a red segment Rl for the left eye, a green segment Gr for the right eye, a green segment Gl for the left eye, a blue segment Br for the right eye, and a blue segment Bl for the left eye.

In a first working mode of the light source 30 using the color wheel shown in FIG. 6, the switching device 35 adjusts the color wheel 33 and the driving device 34 to a proper position in the direction perpendicular to rotation axis 36, so that the excitation light from the light source 31 impinges on the first area 61 to form the light spot 63. When the color wheel 33 rotates around its rotation axis 36 as driven by the driving device 34, the different segments of R, G, B, W in the first area are exposed to the excitation light at different times to generate different colors sequentially. The first light sequence of red, green and blue lights is emitted by the light source system periodically. In a second working mode of the light source system 30 using the color wheel shown in FIG. 6, the switching device 35 adjusts the color wheel 33 and the driving device 34 to another proper position in the direction perpendicular to rotation axis 36, so that the excitation light from the light source 31 impinges on the second area 62 to form the light spot 64. When the color wheel 33 rotates around its rotation axis 36 as driven by the driving device 34, the red segment Rr for the right eye, the red segment R1 for the left eye, the green segment Gr for the right eye, the green segment Gl for the left eye, the blue segment Br for the right eye, and the blue segment Bl for the left eye in the second area 52 are exposed to the excitation light at different times, and a light sequence with a red light for the right eye, a red light for the left eye, a green light for the right eye, a green light for the left eye, a blue light for the right eye, and a blue light for the left eye are generated sequentially. As a result, the second light sequence for the right eye and the left eye is emitted by light source system 30 periodically.

The above-described light source 30 adjusts positions of the excitation light spot on the surface of color wheel through the switching device 35, so that the first area and the second area having different segments can be exposed to the excitation light in different working modes to generate different light sequences. In the above descriptions, all embodiments are described based on primary colors red, green and blue, but other sets of primary colors may also be used to replace red, green and blue lights, as long as each of the first and second areas includes at least two color segments. In addition, the switching device 35 may switch the working modes of light source 30 between the first working mode and the second working mode by adjusting the optical path of the excitation light relative to the light source 30. For example, a galvanometer system may be provided in the optical path of the excitation light of the light source 31, so that the excitation lights will impinge on different areas of color wheel 33 via different propagation directions in the different working modes. In other embodiments, the first area and the second area may generate the first light sequence and the second light sequence through other ways besides exciting the wavelength conversion materials. For example, the first area and the second area may generate the first light sequence and the second light sequence by filtering the excitation light, such as a white light, without using wavelength conversion materials.

Figure 7:
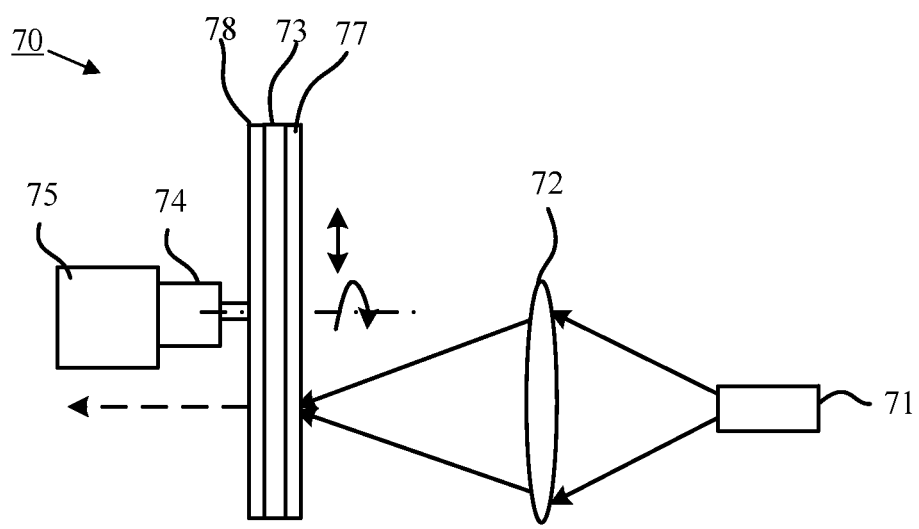
FIG. 7 illustrates a light source system according to a second embodiment of this invention.

FIG. 7 illustrates a light source system according to a second embodiment of this invention. The light source system 70 comprises an excitation light source 71, focusing optics 72, a color wheel 73, a driving device 74, and a switching device 75. The difference between the light source system 70 and the light source system 30 shown in FIG. 3 is that a first dichroic filter 77 is provided on the upstream side (excitation side) of the color wheel 73, and a second dichroic filter 78 is provided on the downstream side of the color wheel 73. The first dichroic filter 77 allows the excitation light to pass through and reflects the first light sequence and/or the second light sequence, and the second filter 78 transmits the first light sequence and/or second light sequence having incident angles smaller than a predetermined threshold angle and reflects the first light sequence and/or second light sequence having greater incident angles than the predetermined angle. As a result, the excitation light passes through the first dichroic filter 77 to excite the materials on the color wheel, while part of the first light and/or the second light generated by the color wheel which travels towards the first dichroic filter 77 will be reflected by the first dichroic filter toward the second dichroic filter 78. The other part (forward traveling part) of the first light and/or the second light also travels towards the second dichroic filter 78. The second dichroic filter 78 transmits the first light sequence and/or the second light sequence (either direct emitted by the color wheel or reflected back by the first dichroic filter 77) having incident angles smaller than a predetermined angle and reflects the first light sequence and/or second light sequence having larger incident angles. The first light sequence and/or the second light sequence reflected from the second dichroic filter 78 is scattered by the color wheel 73 and reflected by the first dichroic filter 77 back toward the second dichroic filter 78. Such re-reflected light is selectively transmitted by the second dichroic filter 78 again based on incident angle in the manner described above. This process repeats, resulting in small incident angle light being output by the second dichroic filter 78.

Through this method, the output angle of first light and/or the second light can be limited to a smaller range and the first light sequence and/or the second light sequence which are reflected can be recycled to improve the luminous efficiency of the light source system 70. In alternative embodiments, the first dichroic filter 77 and the second dichroic filter 78 may be used separately, for example, the second dichroic filter 78 may be provided on the output side of a reflective color wheel (shown in the following embodiments).

In the embodiments shown in FIGS. 3 and 7, the first light sequence and/or the second light sequence is transmitted by the color wheel and output from the opposite side of the excitation light source 31/71. In other embodiments, the first light sequence and/or the second light sequence are reflected or partially reflected by the color wheel and output from the same side as the excitation light source.

Figure 8:
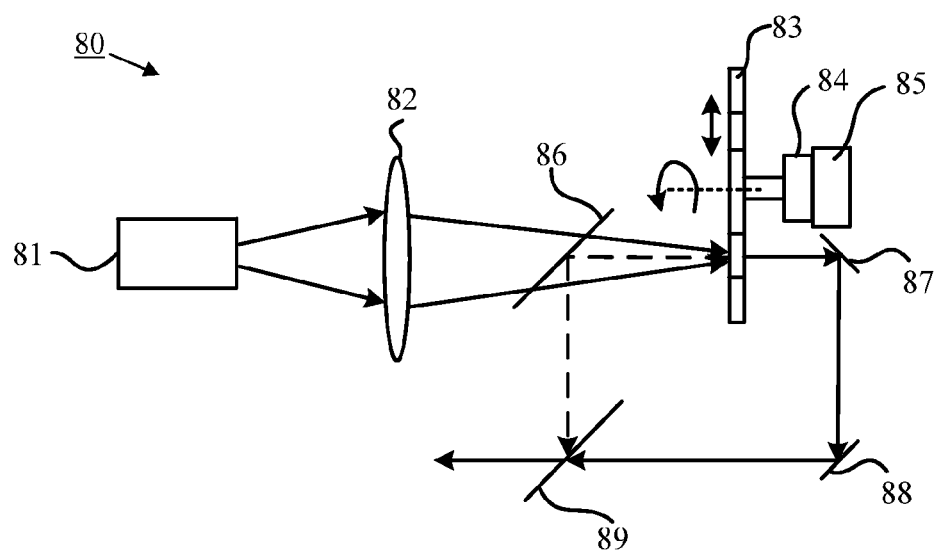
FIG. 8 illustrates a light source system according to a third embodiment of this invention.

FIG. 8 illustrates a light source system according to a third embodiment of this invention. The light source system 80 comprises an excitation light source 81, focusing optics 82, a color wheel 83, a driving device 84, and a switching device 85. The color wheel 83 is configured to have a first area with two or more first segments and a second area with two or more second segments, such as in the color segment arrangements shown in FIG. 4-6, to generate a first light sequence and/or a second light sequence in two working modes.

A difference between the light source system 80 and light source system 30 shown in FIG. 3 lies in the transmission/reflection nature of the various segments of the color wheels. In the color wheel 83, some of the first segments in the first area allow some colors the first light sequence to pass through, while other ones of the first segments in the first area reflects other colors of the first light sequence. The light which is transmitted through the color wheel 83 and the light which is reflected by color wheel 83 are combined by a light combining device including dichroic filters 86 and 89 and reflective mirrors 87 and 88. For example, when the color wheel 83 has a structure as shown in FIG. 4, a blue excitation light from the light source 81 is collected and transferred by focusing optics 82, transmitted through the dichroic filters 86 and incident onto the color wheel 83. The blue excitation light is transmitted by the blue segment of the first area on the color wheel 83, while the blue excitation light is converted to red light and green light by the red segment and the green segment of the first area, respectively, and red light and green light are reflected by the color wheel 83. The blue excitation light transmitted by the color wheel is reflected by the reflective mirrors 87 and 88, and is transmitted by the dichroic filters 89. The backward-traveling red and green light are reflected by the dichroic filters 86, and then reflected by the dichroic filter 89. This results in the combination of the blue excitation light and the red and green converted light by the dichroic filters 89. Similarly, some of the second segments in the second area of color wheel 83 transmit some colors of the second light sequence and other ones of the second segments reflect some colors of the second light sequence. These transmitted and reflected are combined by the light combining device 86-89. Furthermore, the light combining device may have other suitable designs in addition to that shown in FIG. 8.

Figure 9:
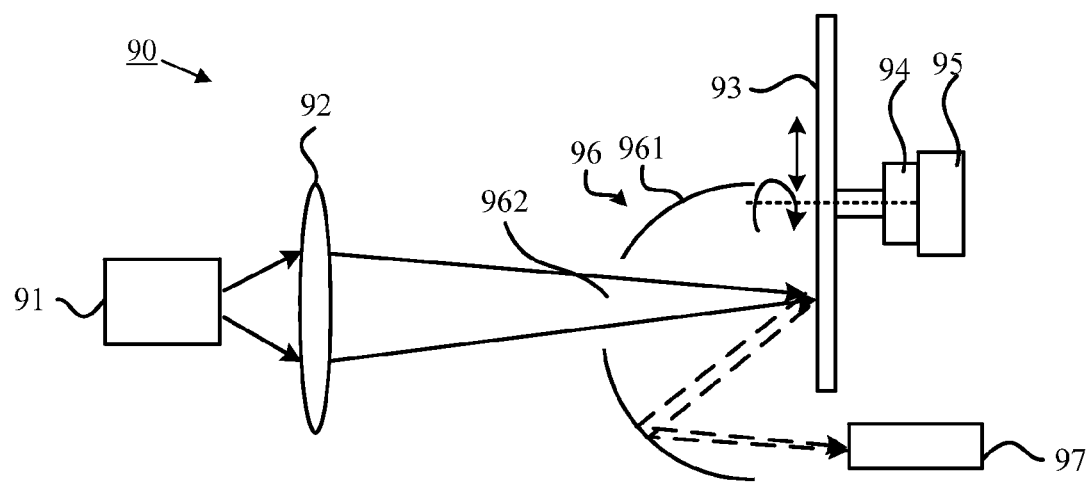
FIG. 9 illustrates a light source system according to a forth embodiment of this invention.

FIG. 9 illustrates a light source system according to a forth embodiment of this invention. The light source system 90 comprises an excitation light source 91, focusing optics 92, a color wheel 93, a driving device 94, a switching device 95, a reflective device 96, and a light intergrator 97. The color wheel 93 is configured to have a first area with two or more first segments and a second area with two or more second segments, such as in the color segment arrangements shown in FIG. 4-6, to generate a first light sequence and/or a second light sequence in two working modes. A difference between the light source system 90 and light source system 30 shown in FIG. 3 is that in this embodiment the first light sequence and the second light sequence are reflected by the color wheel 93, and then collected by the reflective device 96 and the light intergrator 97. The reflective device 96 may be an arc-shaped reflective layer 961 (for example, spherical reflective layer or ellipsoid reflective layer) with an opening 962 on the arc-shaped reflective layer 961. The opening 962 may be a through hole or a transmissive area. The excitation light from the light source 91 is collected by focusing device 92 before impinges on the color wheel 93 by passing through the opening 962. The first light sequence or the second light sequence generated by the color wheel 93 is reflected by the arc-shaped reflective layer 961 and then propagates to the entrance of the light intergrator 97.

In one particular embodiment, the arc-shaped reflective layer 961 is an ellipsoid layer, which reflects lights from one focusing point to the other focusing point. Therefore, the emitting spot of the first light sequence or the second light sequence on the color wheel 93 should be located on one focusing point of the ellipsoid reflective layer 961, while the entrance of light intergrator 97 is located on the other focusing point. In another embodiment, the arc-shaped reflective layer 961 is a spherical layer. For two points near the center of the sphere and symmetric with respect to the center of sphere, the lights from one point will be reflected by the spherical reflective layer to the other point. Therefore, the emitting spot of the first light sequence or the second light sequence on the color wheel 93 should be located on one point of the spherical reflective layer, while the entrance of light intergrator 97 is located on the other point symmetrical of the first point with respect to the center of the sphere.

In this embodiment, by adjusting the sizes of the opening 962 and the arc-shaped reflective layer 961, the luminous flux of the first light sequence or the second light sequence escaped from the opening 962 will be not more than one quarter of the luminous flux collected by the arc-shaped reflective layer 961, so excessive luminous flux loss of the first light sequence or the second light sequence is avoided. The area of the opening 962 is preferably not more than a quarter of the area of the arc-shaped reflective layer 961.

Figure 10:
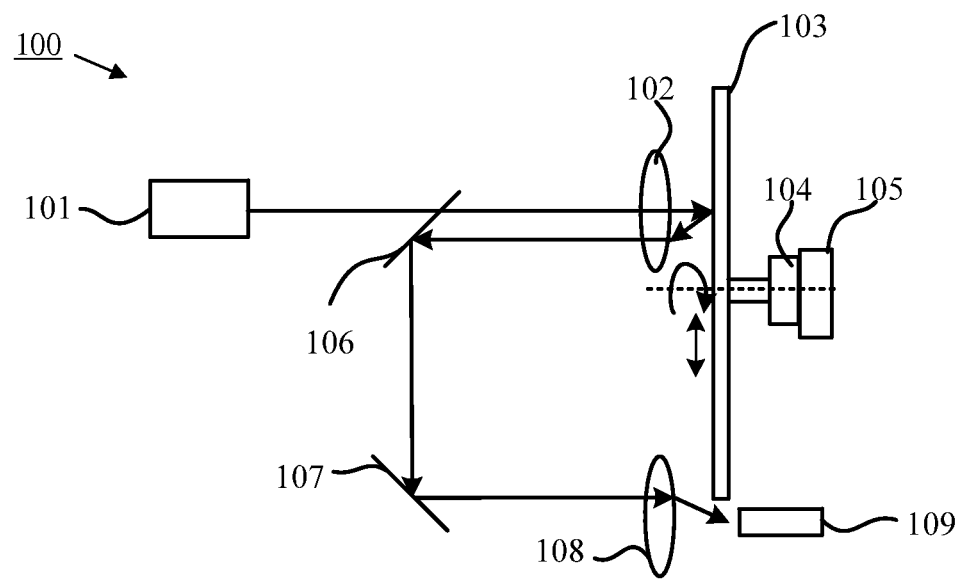
FIG. 10 and FIG. 11 illustrate two different light source systems according to a fifth embodiment of this invention.
Figure 11:
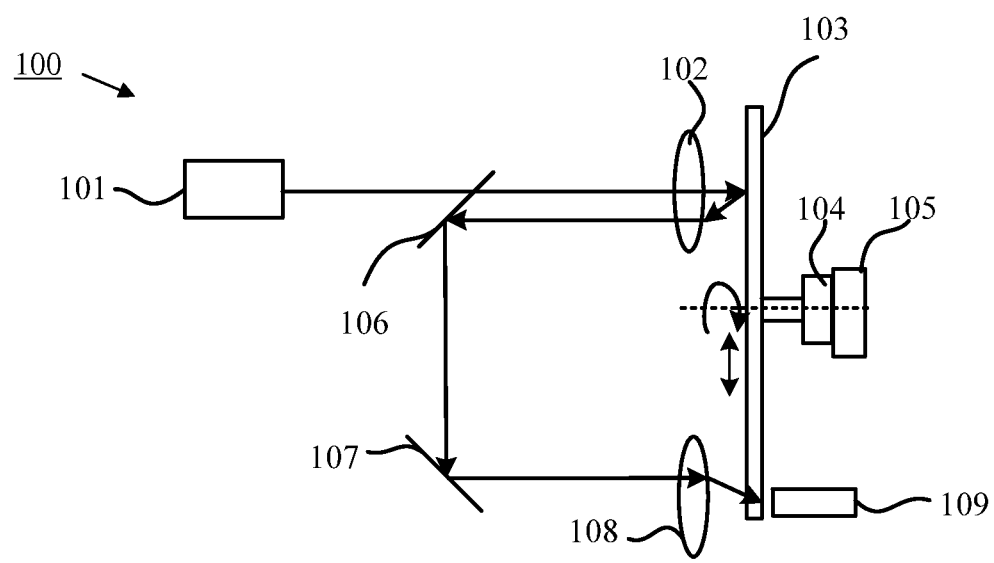

FIG. 10 and FIG. 11 illustrate two different working modes of a light source system 100 according to a fifth embodiment of this invention. As shown in FIG. 10 and FIG. 11, light source system 100 comprises an excitation light source 101, a focusing device 102, a color wheel 103, a driving device 104, a switching device 105, a dichroic filter 106, a reflective minor 107, a focusing device 108, and a light intergrator device 109.

Figure 12:
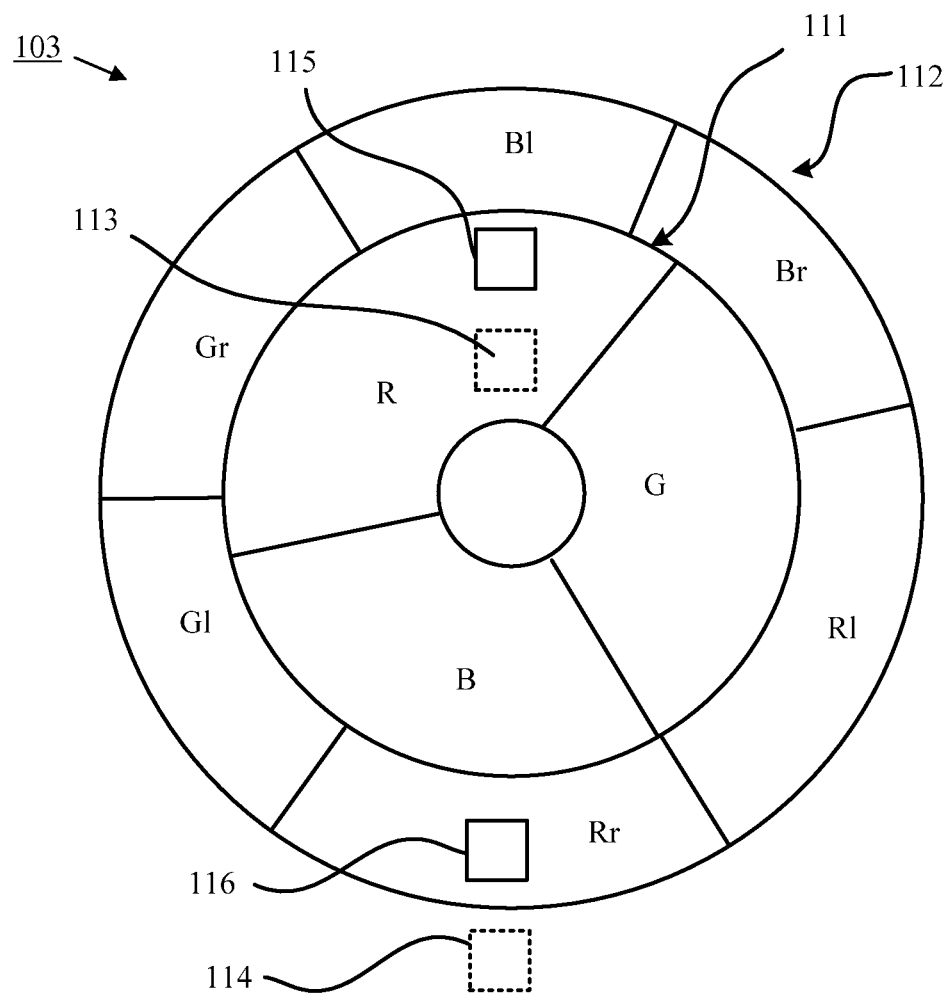
FIG. 12 illustrates a first example of the color wheel 103 shown in FIG. 10 and FIG. 11.

FIG. 12 illustrates the front view of a first example of the color wheel 103 shown in FIG. 10 and FIG. 11. As shown in FIG. 12, the color wheel 103 comprises a first area 111 and a second area 112. The first area 111 is configured to have a red segment R, a green segment G and a blue segment B, and the second area is configured to have a red segment Rr for the right eye, a red segment Rl for the left eye, a green segment Gr for the right eye, a green segment Gl for the left eye, a blue segment Br for the right eye, and a blue segment Bl for the left eye.

In the first working mode of the light source system 100 (as shown in FIG. 10), the switching device 105 adjusts the color wheel 103 and driving device 104 to a proper position in the direction perpendicular to rotation axis, so that the excitation light from the light source 101 impinges on the first area 51 to form the light spot 113 after passing through the dichroic filter 106. When the color wheel 103 rotates around its rotation axis as driven by the driving device 104, the red segment R, green segment G, and blue segment B in the first area are exposed to the excitation light at different times, and the lights including red, green, blue lights are generated sequentially, resulting in the first light sequence of red, blue and green lights. The light from the first area is reflected by each segment respectively to form the first light sequence which propagates in the direction opposite of the excitation light. The first light sequence is reflected by the dichroic filter 106 and reflective minor 107, then collected and transferred by focusing device 108, and finally enters the light intergrator device 109 after passing outside the second area 112 of the color wheel 103 at a position shown as a phantom spot 114 in FIG. 12. In the example shown in FIG. 10, the location 114 where the light intersects a plane of the color wheel 103 is located outside of the physical structure of the color wheel 103. Alternatively, the location 114 may be inside the physical area of the color wheel 103 and the color wheel is clear and transparent (with no wavelength conversion materials or color filter) in a ring-shaped area traversed by the light spot 114. As a result, the first light sequence of red, green, blue lights is generated periodically by the light source system 100.

In the second working mode of light source system 100 (as shown in FIG. 11), the switching device 105 adjusts color wheel 103 and the driving device 104 to another proper position in the direction perpendicular to rotation axis 106, so that the excitation light from the light source 101 impinges on the first area 111 after passing through the dichroic filter 106 to form a light spot 115 (see FIG. 12). When the color wheel 104 rotates around its rotation axis as driven by the driving device 104, the red segment R, the green segment G and the blue segment B in the first area are exposed to the excitation light at different times, and lights including red, green, and blue lights are generated sequentially, resulting in the first light sequence of red, blue and green lights. The light from the first area is reflected by each segment respectively to form the first light sequence which propagates in the direction opposite of the excitation light. The first light sequence is reflected by the dichroic filter 106 and the reflective minor 107, then collected and transferred by the focusing device 108, and impinges on the second area 112 of color wheel 103 (shown as the light spot 116 in FIG. 12). The first light sequence impinges on the red segment Rr for the right eye, the red segment Rl for the left eye, the green segment Gr for the right eye, the green segment Gl for the left eye, the blue segment Br for the right eye, and the blue segment Bl for the left eye sequentially, resulting in the generation of a red light for the right eye, a red light for the left eye, a green light for the right eye, a green light for the left eye, a blue light for the right eye, and a blue light for the left eye sequentially. Thus the second light sequence including the light for the right eye and the left eye is generated periodically by light source system 100.

In this embodiment, certain color light of the first light sequence will impinge on the corresponding color segment for the right eye and the left eye in the second area, so segments for the right eye and the left eye in the second area do not need to include wavelength conversion materials; instead, the second area includes corresponding color dichroic filters or polarizers. Further, the angular distribution and location distribution of segments for the right eye and the left eye with different colors in the second area 112 correspond with the angular distribution and location distribution of segments with corresponding colors. For example, the light spot 115 in the first area 111, formed by the excitation light, and the light spot 116 in the second area, formed by the first light sequence after going through the filter 106, reflector 107 and lens 108, are locate in opposite sides of the rotation axis of the color wheel 103. The two light spots form an angle of 180 degree with respect to the rotation axis on the surface of the color wheel 103. Further, the combined angular range the same color segments for the right eye and the left eye (e.g. Rr and Rl) is equal to the angular range of the corresponding color segment in the first area (e.g. R) and are located at opposite angles. Alternatively, the first area 111 and the second area 112 may be designed so that the first light sequence and/or the second light sequence can be either transmitted or reflected.

Figure 13:
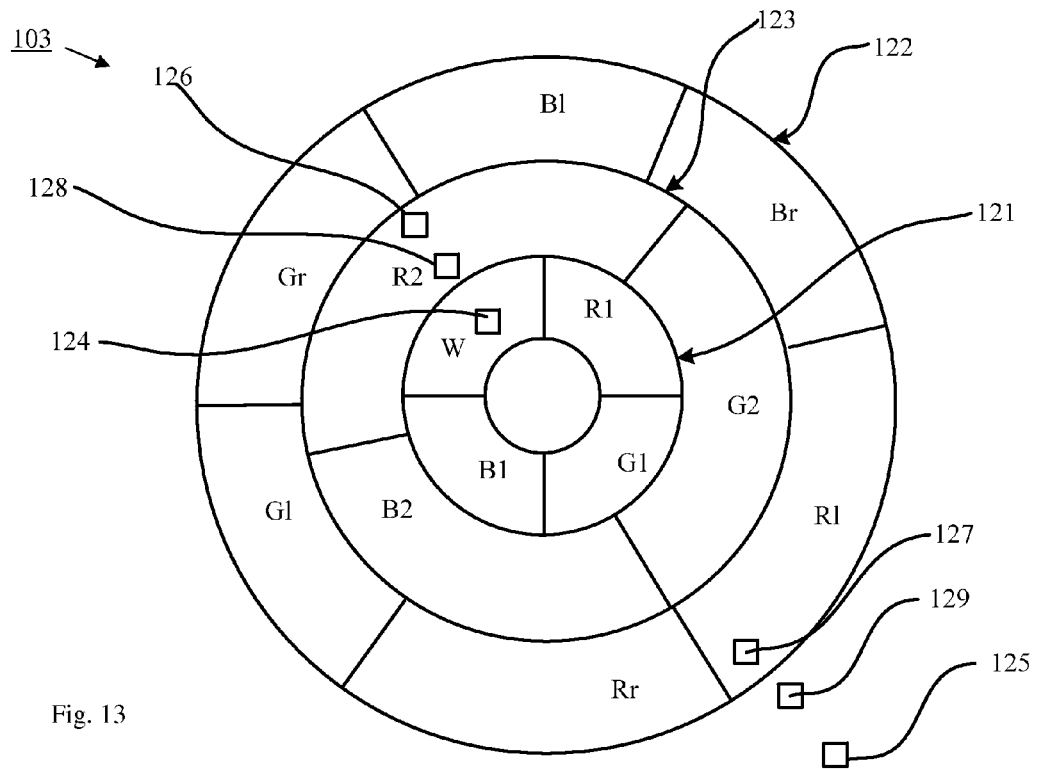
FIG. 13 illustrates a second example of the color wheel 103 shown in FIG. 10 and FIG. 11.

FIG. 13 illustrates the front view of a second example of the color wheel 103 used in the system of in FIG. 10 and FIG. 11. As shown in FIG. 13, the color wheel 103 comprises a first area 121, a second area 122 and a third area 123. The first area 121 is configured to have a red segment R1, a green segment G1, a blue segment B1 and a white segment W. The second area is configured to have a red segment Rr for the right eye, a red segment Rl for the left eye, a green segment Gr for the right eye, a green segment Gl for the left eye, a blue segment Br for the right eye, and a blue segment Bl for the left eye. The third area is configured to have a red segment R2, a green segment G2 and a blue segment B2.

Using this color wheel, in a first working mode of light source system 100 (as shown in FIG. 10), the switching device 105 adjusts the color wheel 103 and the driving device 104 to a proper position in the direction perpendicular to rotation axis, so that the excitation light from the light source 101 impinges on the first area 121 to form a light spot 124 (see FIG. 13) after passing through the opening 106. When the color wheel 103 rotates around its rotation axis as driven by the driving device 104, the red segment R1, the green segment G1, the blue segment B1, and the white segment W in the first area are exposed to the excitation light at different times, and red, green, blue, and white lights are generated sequentially. The light from the first area is reflected by each segment respectively forming the first light sequence which propagates in the direction opposite of the excitation light. The first light sequence is reflected by the dichroic filter 106 and the reflective mirror 107, and impinges on the light intergrator device 109 after being collected by the focusing device 108 and passing around the color wheel 103 (the intersection position of the light and the plane of the color wheel 103 is shown as a phantom spot 125 in FIG. 13). As a result, the first light sequence of red, blue, green, white lights is generated periodically by the light source system 100. In alternative embodiments, the first light sequence enters the light intergrator device 109 after passing through a transparent peripheral area of the color wheel 103 outside of the second area 122.

In a second working mode of the light source system 100 (as shown in FIG. 11), the switching device 105 adjusts the color wheel 103 and the driving device 104 in the direction perpendicular to rotation axis to another position, so that the excitation light from the light source 101 impinges on the third area 123 to form the light spot 126 (see FIG. 13) after passing through the dichroic filter 106. When the color wheel 103 rotates around its rotation axis as driven by the driving device 104, the red segment R2, the green segment G2, and the blue segment B2 in the third area are exposed to the excitation light at different times, and the red, green, blue lights are generated sequentially. The light from the third area is reflected by each segment respectively to form the third light sequence which propagates in the direction opposite of the excitation light. The third light sequence is reflected by the dichroic filter 106 and the reflective mirror 107, and impinges in the second area 122 of the color wheel 103 after being collected by the focusing device 108 to form a light spot 127. The third light sequence impinges on the red segment Rr for the right eye, the red segment Rl for the left eye, the green segment Gr for the right eye, the green segment Gl for the left eye, the blue segment Br for the right eye, and the blue segment Bl for the left eye in the second area respectively, resulting in the generation of a red light for the right eye, a red light for the left eye, a green light for the right eye, a green light for the left eye, a blue light for the right eye, and a blue light for the left eye. As a result, the second light sequence including lights for the right eye and the left eye is generated periodically by the light source system 100.

Further, in this embodiment the light source system 100 has the third working mode. In the third working mode of the light source system 100, the switching device 105 adjusts the color wheel 103 and the driving device 104 to in a direction perpendicular to the rotation axis to another proper position, so that the excitation light from the light source 101 impinges on the third area 122 to form the light spot 128 after passing through the opening 106. When the color wheel 103 rotates around its rotation axis as driven by the driving device 104, the red segment R2, the green segment G2, and the blue segment B2 in the third area 123 are exposed to the excitation light at different times, and red, green, blue lights are generated sequentially. The light from the third area is reflected by each segment respectively to form the third light sequence which propagates in the direction opposite of the excitation light. The third light sequence is reflected by the dichroic filter 106 and the reflective mirror 107, and impinges on the light intergrator device 109 after being collected by the focusing device 108 and passing around the color wheel 103 (the intersection position of the light with the plane of the color wheel 103 is shown as a phantom spot 129 in FIG. 13). As a result, the third light sequence of red, blue, green lights is generated periodically by the light source system 100.

Figure 14:
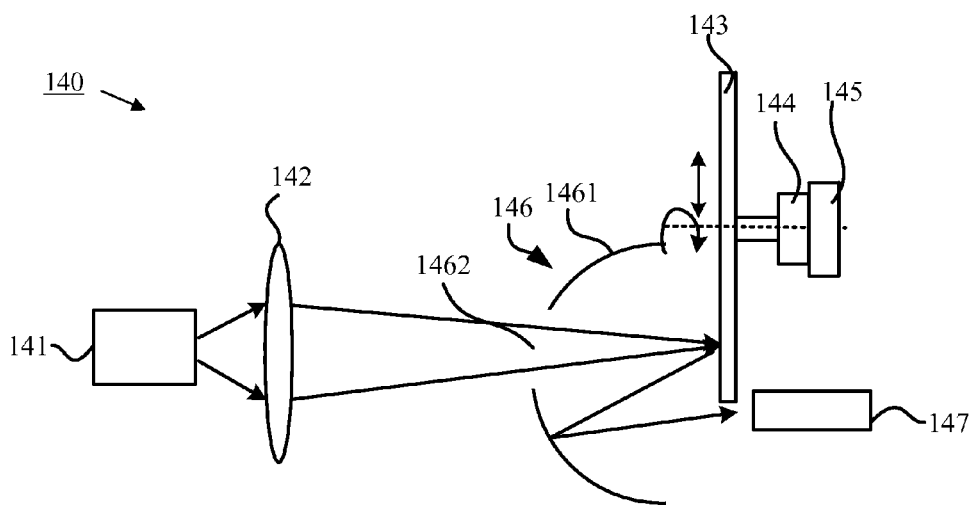
FIG. 14 and FIG. 15 illustrate two light source systems according to a sixth embodiment of this invention.
Figure 15:
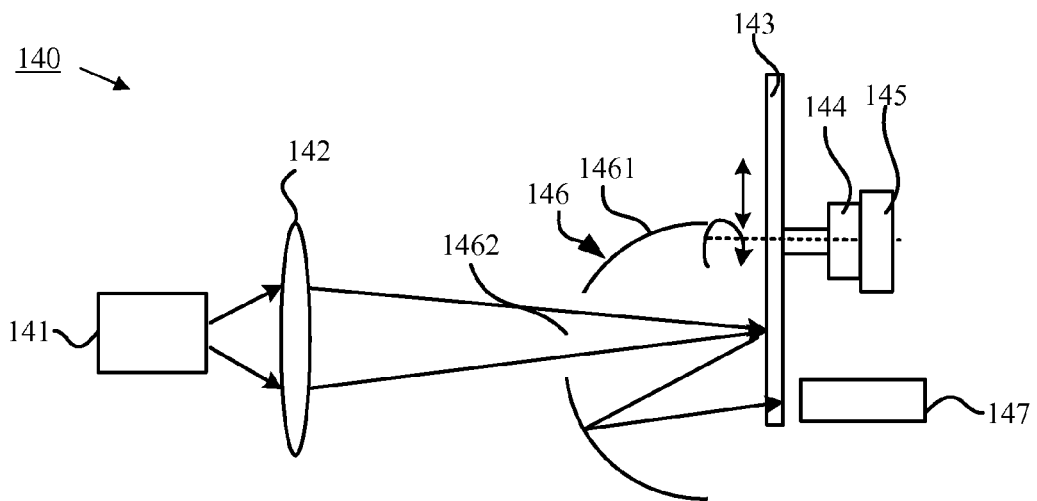

FIG. 14 and FIG. 15 illustrate two working modes of a light source system according to a sixth embodiment of this invention. As shown in FIG. 14 and FIG. 15, the light source system 140 comprises am excitation light source 141, focusing optics 142, a color wheel 143, a driving device 144, a switching device 145, a reflective device 146 and a light intergrator 147. The reflective device 146 contains an arc-shaped reflective layer 1461 with an opening 1462.

The difference between the light source system 140 in this embodiment and light source system 100 shown in FIG. 10 and FIG. 11 is that the reflective device 146 is used to replace the dichroic filter 106 and reflective minor 107 in FIGS. 10 and 11. The working principle of the reflective device 146 is similar to that of the reflective device 86 in the embodiment of FIG. 9 and explained in detail above.

Figure 16:
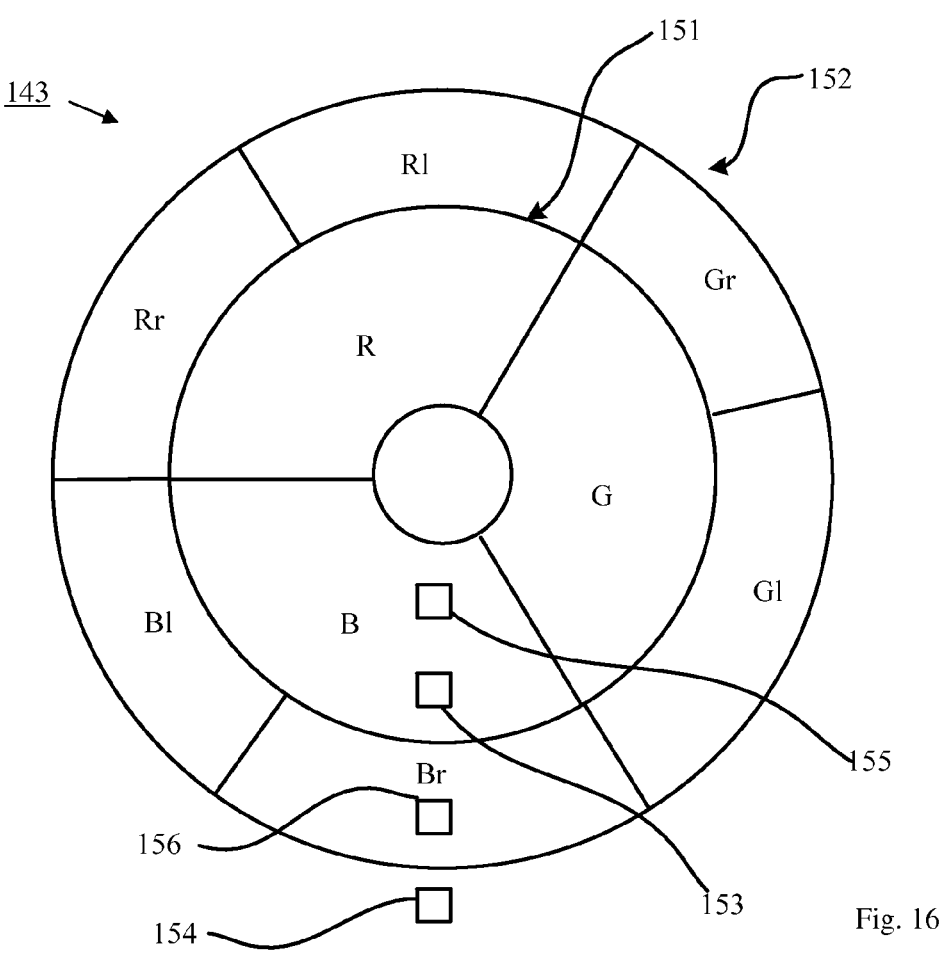
FIG. 16 illustrates a first example of the color wheel 143 shown in FIG. 14 and FIG. 15.

FIG. 16 illustrates a front view of a first example of the color wheel 143 used in the system shown in FIG. 14 and FIG. 15. As shown in FIG. 15, the color wheel 143 comprises a first area 151 and a second area 152. The first area 151 is configured to have a red segment R, a green segment G, a blue segment B and a white segment W. The second area 152 is configured to have a red segment Rr for the right eye, a red segment Rl for the left eye, a green segment Gr for the right eye, a green segment Gl for the left eye, a blue segment Br for the right eye, and a blue segment Bl for the left eye.

In a first working mode of the light source system 140, the switching device 145 adjusts the color wheel 143 and the driving device 144 to a proper position shown in the FIG. 14 in the direction perpendicular to rotation axis, so that the excitation light from the light source 141 impinges on the first area 151 to form the light spot 153 after pass through the opening 1462. When the color wheel 143 rotates around its rotation axis as driven by the driving device 144, the red segment R, the green segment G, and the blue segment B in the first area 151 are exposed to the excitation light at different times, and the red, green, blue, white lights are generated sequentially. The light from the first area 151 will be reflected by each segment respectively to form the first light sequence which propagates in the direction opposite of the excitation light. The first light sequence is collected by the arc-shaped reflective layer, and reflected to the light intergrator device 109 after passing around the edge of the color wheel 103 (the intersection position of the light with the plane of the color wheel 143 is shown as a phantom spot 154 in FIG. 16). As a result, the first light sequence of red, blue, green lights is generated periodically by the light source system 140.

In a second working mode of the light source system 140, the switching device 145 adjusts the color wheel 143 and the driving device 104 to another proper position shown in FIG. 15 in the direction perpendicular to rotation axis, so that the excitation light from the light source 141 impinges on the first area 151 to form the light spot 155. When the color wheel 143 rotates around its rotation axis as driven by the driving device 144, the red segment R, the green segment G, and the blue segment B in the first area are exposed to the excitation light at different times, and red, green, blue lights are generated sequentially. The light from the first area 151 is reflected by each segment respectively to form the first light sequence which propagates in the direction opposite to the excitation light. The first light sequence is collected by the arc-shaped reflective layer 1461 and then reflected to the second area 152 of the color wheel (shown as light spot 156). The first light sequence impinges on the red segment Rr for the right eye, the red segment Rl for the left eye, the green segment Gr for the right eye, the green segment Gl for the left eye, the blue segment Br for the right eye, and the blue segment Bl for the left eye in the second area 152 respectively, resulting in the generation of a red light for the right eye, a red light for the left eye, a green light for the right eye, a green light for the left eye, a blue light for the right eye and a blue light for the left eye. As a result, the second light sequence including the light for the right eye and the left eye is generated periodically by light source system 140.

In this embodiment, it should be noted that the light spot 153 in the first area 151 formed by excitation light and the light spot 156 in the second area 152 formed by the first light sequence are locate on the same side of the rotation axis of the color wheel 153 and the two light spots form an angle of 0 degree with respect to the rotation axis. Therefore, the color segments for the right eye and the left eye in the second area 152 (e.g., segments Br and Bl) and the corresponding color segment in the first area 151 (e.g., segment B) should be located on the same side of the rotation axis.

Figure 17:
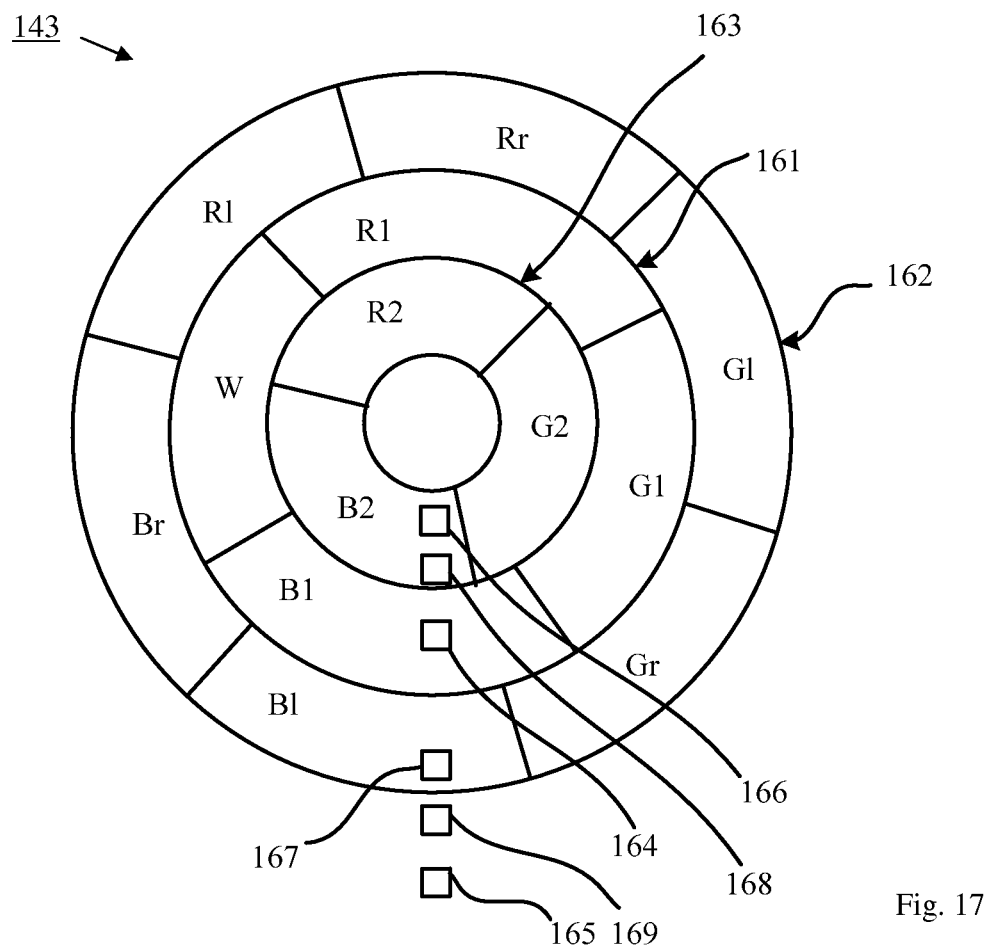
FIG. 17 illustrates a second example of the color wheel 143 shown in FIG. 14 and FIG. 15.

FIG. 17 illustrates the front view of a second example of the color wheel 143 used in the system 140 shown in the FIG. 14 and FIG. 15. As shown in FIG. 17, the color wheel 143 comprises a first area 161, a second area 162 and a third area 163. The first area 161 is configured to have a red segment R1, a green segment G1, a blue segment B1, and a white segment W. The second area 162 is configured to have a red segment Rr for the right eye, a red segment Rl for the left eye, a green segment Gr for the right eye, a green segment Gl for the left eye, a blue segment Br for the right eye, and a blue segment Bl for the left eye. The third area 163 is configured to have a red segment R2, a green segment G2, and a blue segment B2.

Using the color wheel shown in FIG. 17, in the first working mode of light source system 140, the switching device 145 adjusts the color wheel 103 and the driving device 104 in the direction perpendicular to the rotation axis to a proper position shown in FIG. 14, so that the excitation light from the light source 141 impinges on the first area 161 to form the light spot 164 after passing through the opening 1462. When the color wheel 143 rotates around its rotation axis as driven by the driving device 144, the red segment R1, the green segment G1, the blue segment B1, and the white segment W in the first area 161 are exposed to the excitation light at different times, and the red, green, blue, white lights are generated sequentially. The light from the first area is reflected by each segment respectively to form the first light sequence which propagates in the direction opposite of the excitation light. The first light sequence is collected by arc-shaped reflective layer 1461 and then reflected to the light intergrator device 147 by passing around the outside of color wheel 143 (the intersection position of the light with the plane of the color wheel is shown as a phantom spot 165). As a result, the first light sequence of red, blue, green, white lights is generated periodically by the light source system 140.

In the second working mode of the light source system 140, the switching device 145 adjusts the color wheel 143 and the driving device 144 in the direction perpendicular to rotation axis to another proper position shown in FIG. 15, so that the excitation light from the light source 141 impinges on the third area 163 to form the light spot 166 after passing through the opening 1462. When the color wheel 163 rotates around its rotation axis a driven by the driving device 164, the red segment R2, the green segment G2, and the blue segment B2 in the third area 163 are exposed to the excitation light at different times, and red, green, blue lights are generated sequentially. The light from the third area 163 is reflected by each segment respectively to form the third light sequence which propagates in the direction opposite of the excitation light. The third light sequence is collected and reflected by the arc-shaped reflective layer 1462 and impinges on the second area 162 of the color wheel 143 to form the light spot 167. The third light sequence impinges on the red segment Rr for the right eye, the red segment Rl for the left eye, the green segment Gr for the right eye, green segment Gl for the left eye, the blue segment Br for the right eye, and the blue segment Bl for the left eye in the second area continuously, resulting in the generation of a red light for the right eye, a red light for the left eye, a green light for the right eye, a green light for the left eye, a blue light for the right eye, and a blue light for the left eye. As a result, the second light sequence including lights for the right eye and the left eye is generated periodically by the light source system 140.

Figure 18:
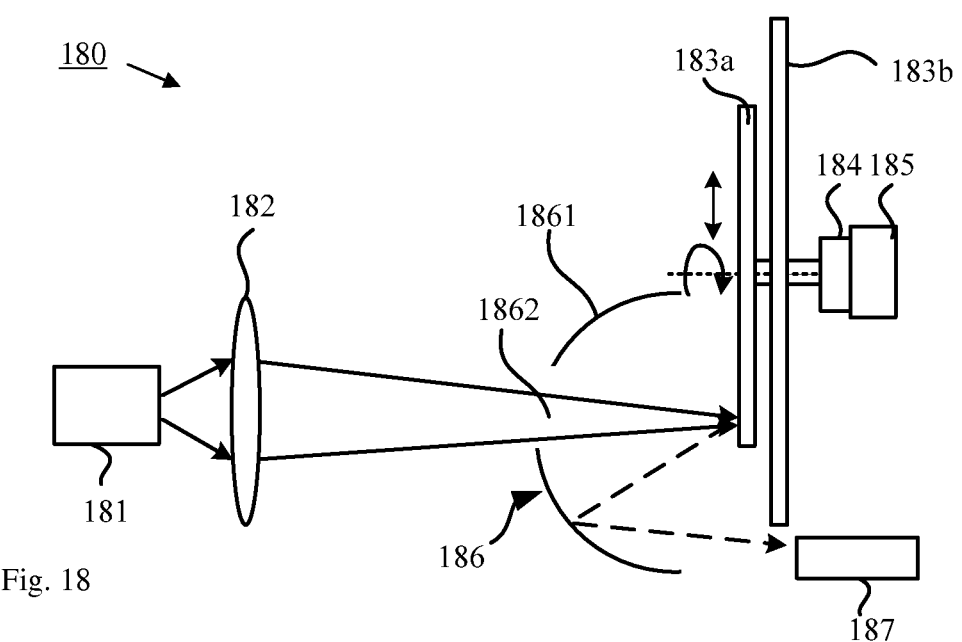
FIG. 18 and FIG. 19 illustrate two light source systems according to a seventh embodiment of this invention.
Figure 19:
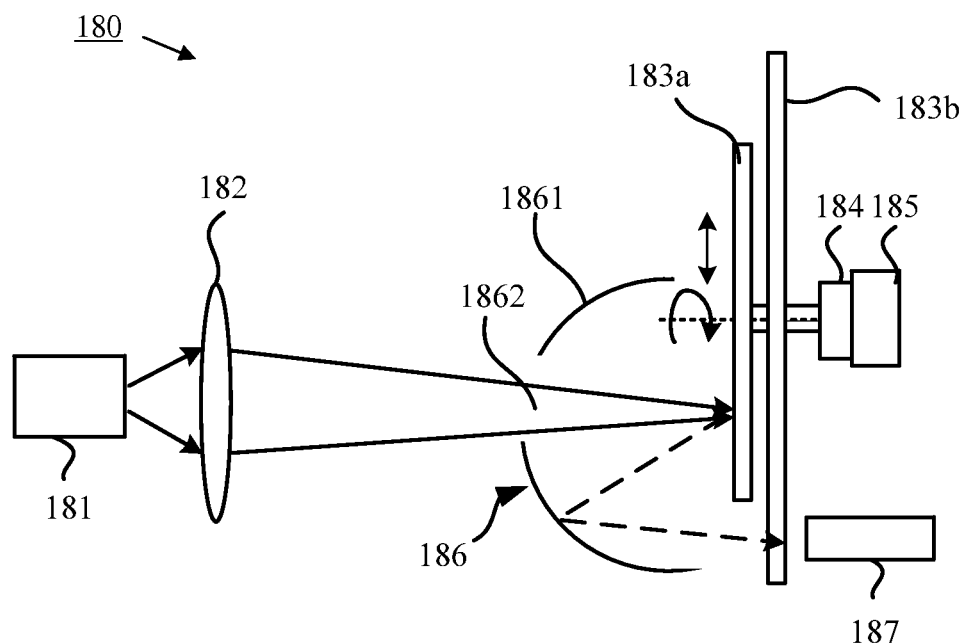

In addition, in this embodiment the light source system 140 has a third working mode. In the third working mode of the light source system 140, the switching device 145 adjusts the color wheel 143 and the driving device 144 in the direction perpendicular to rotation axis to another proper position again, so that the excitation light from the light source 141 impinges on the third area 163 to form a light spot 168 after passing through the opening 1462. When the color wheel 143 rotates around its rotation axis as driven by the driving device 144, the red segment R2, the green segment G2, and the blue segment B2 in the third area 163 are exposed to the excitation light at different times, and the red, green, blue lights are generated sequentially. The light from the third area is reflected by each segment respectively to form the third light sequence which propagates in the direction opposite of the excitation light. The third light sequence is collected and reflected by arc-shaped reflective layer 1461, and impinges on the light intergrator device 147 after passing around the color wheel 143(the intersection position of the light with the plane of the color wheel 143 is shown as a phantom spot 169 in FIG. 17). As a result, the third light sequence of red, blue, green lights is generated periodically by light source system 140. FIG. 18 and FIG. 19 illustrate two working modes of a light source system according to a seventh embodiment of this invention. As shown in FIG. 18 and FIG. 19, the light source system 180 comprises a light source 181, a focusing optics 182, a first color wheel 183a, a second color wheel 183b, a driving device 184, a switching device 185, a reflective device 186, and a light intergrator 187. The reflective device 186 contains an arc-shaped reflective layer 1861 with an opening 1862 on the arc-shaped reflective layer.

Figure 20:
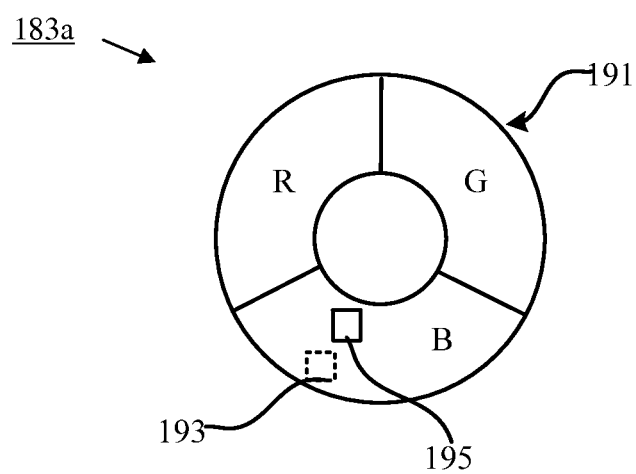
FIGS. 20 and 21 illustrate examples of color wheels 183a and 183b shown in the FIG. 18 and FIG. 19.
Figure 21:
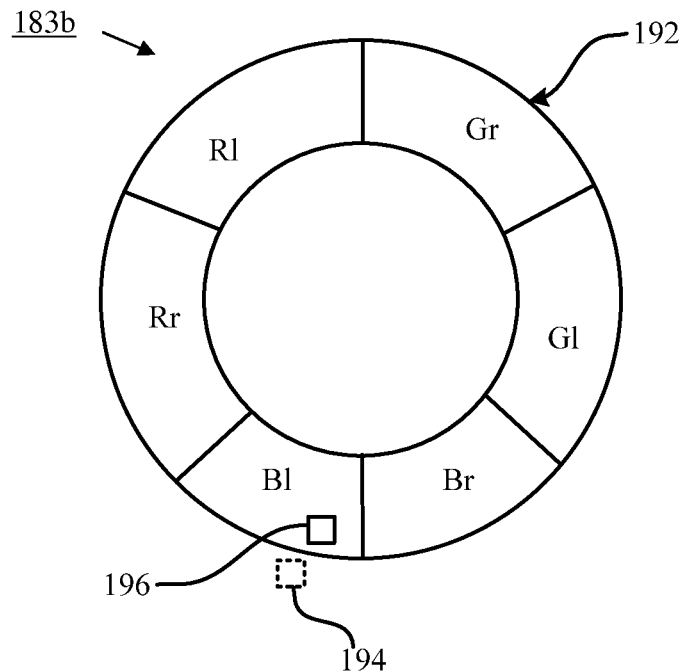

A difference between the light source system 180 in this embodiment and the light source system 140 shown in FIG. 14 and FIG. 15 is that a first color wheel 183a and a second color wheel 183b are used to replace the color wheel 143 in light source system 140. As shown in FIG. 20 and FIG. 21, the first color wheel 183a includes a first area 191 which is a ring-shaped area containing a red segment R, a green segment G, and a blue segment B along the circumferences, and the second color wheel 183b includes a second area 192 which is also ring-shaped area containing a red segment Rr for the right eye, a red segment Rl for the left eye, a green segment Gr for the right eye, a green segment Gl for the left eye, a blue segment Br for the right eye, and a blue segment Bl for left the eye along the circumferences.

In this embodiment the first color wheel 183a and the second color wheel 183b are coaxially arranged and parallel to each other, and rotate synchronously with each other as driven by the driving device 184. The first color wheel 183a, the second color wheel 183b and the driving device 184 can be moved by the switching device 185 in the direction perpendicular to rotation axis of the first color wheel 183a and the second color wheel 184a.

In the first working mode of the light source system 180 shown in FIG. 18, the excitation light from the light source 181 impinges on the first area 191 to form a light spot 193 (see FIG. 20), and then the first light sequence generated by the first color wheel 183a impinges on the light intergrator device 147 after passing around the edge of the second color wheel 183b (the intersection position of the light with the plane of the second color wheel 183b is shown as a phantom spot 194). As a result, the first light sequence is generated periodically by the light source system 180.

In the second working mode of light source system 180 shown in FIG. 19, the excitation light from the light source 181 impinges on the first area 191 to form a light spot 195, and then the first light sequence from the first color wheel 183a impinges on the second area 192 of the second color wheel 183b (shown as light spot 196). As a result, the second light sequence is generated periodically by light source system 180.

Figure 22:
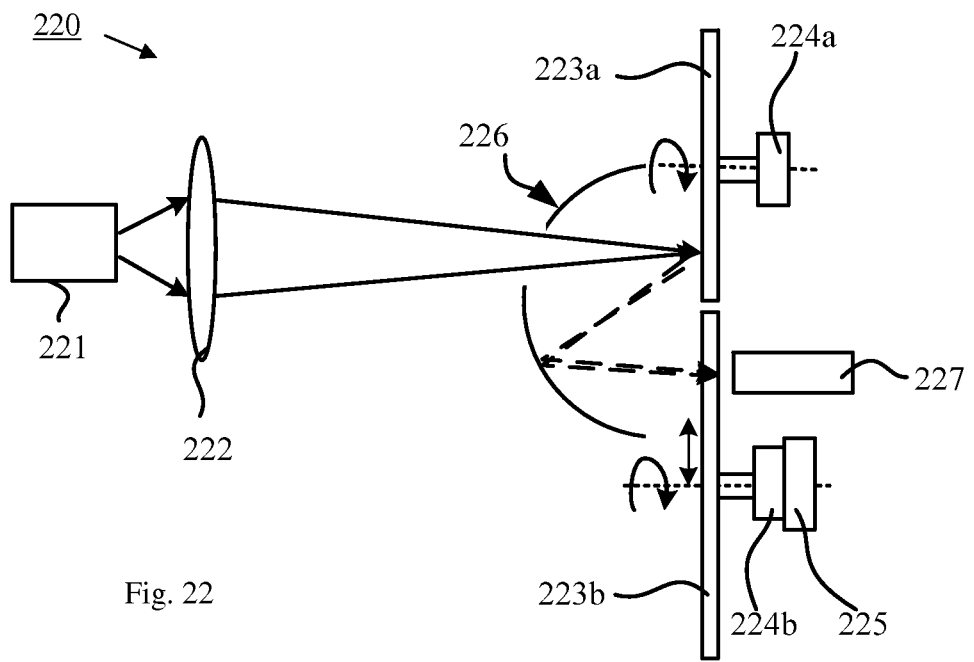
FIG. 22 illustrates a light source system according to an eighth embodiment of this invention.

FIG. 22 illustrates a light source system according to an eighth embodiment of this invention. As shown in FIG. 22, the light source system 220 comprises a light source 221, a focusing optics 222, a first color wheel 223a, a second color wheel 223b, a first driving device 224a, a second driving device 224b, a switching device 225, a reflective device 226, and a light intergrator 227.

A difference between the light source system 220 in this embodiment and the light source system 180 shown in FIG. 18 and FIG. 19 is that the first color wheel 223a is driven by the first driving device 224a while the second color wheel 223b is separately driven by the second driving device 224b. The second color wheel 223b may be moved by the switching device 225 in the direction perpendicular to the rotation axis of the second color wheel 223b, resulting in the switching between the first working mode and the second working mode of the light source system 220.

In alternative embodiments, one more switching device (not shown in the figure) may be arranged on the first color wheel 223a and the first driving device 224a, and the first working mode and the second working mode of the light source system may be switched trough the movement of the first color wheel 223a in the direction perpendicular to rotation axis of the first color wheel 223a.

It can be seen that in all embodiments described above, the moving color device (color wheel) has two or more areas located adjacent each other, each area having two or more color segments, each color segment carrying a wavelength conversion material or a filter or neither. When the moving color device is wheel shaped, the two or more areas are arranged in concentric circles.

In the illustrated examples of the color wheel, the first area, the second area and the third area are arranged on a single color wheel; alternatively, the color segments may be separated and arranged on different color wheels, which are driven by different driving devices respectively.

It will be apparent to those skilled in the art that various modification and variations may be made in the multicolor light source system and related image projection device of the present invention without departing from the spirit or scope of the invention. Thus, it is intended that the present invention cover modifications and variations that come within the scope of the appended claims and their equivalents.

What is claimed is:

1. A light source system, comprising:
a light source for generating an excitation light;
a moving color device disposed to receive the excitation light, the moving color device including a first area and a second area, wherein the first area includes two or more first segments, and the second area includes two or more second segments;
a driving device for driving the moving color device to move periodically to generate a first light sequence in a first working mode and to generate a second light sequence in a second working mode, wherein the first light sequence contains first lights generated sequentially by the two or more first segments and the second light sequence contains second lights generated sequentially by the two or more second segments, the first light sequence being different from the second light sequence; and
a switching device for switching the moving color device between the first working mode and the second working mode,
wherein the first lights are generated periodically in a first plurality of consecutive time periods in the first working mode, the second lights are generated periodically in a second plurality of consecutive time periods in the second working mode, the first plurality of consecutive time periods and the second plurality of consecutive time periods being different time periods and non-interleaving with each other during the first working mode and during the second working mode.

2. The light source system of claim 1, wherein the excitation light impinges on the first area in the first working mode and the two or more first segments in the first area periodically emit lights sequentially to generate the first light sequence, and wherein the excitation light impinges in the second area in the second working mode and the two or more second segments in the second area periodically emit lights sequentially to generate the second light sequence.

3. The light source system of claim 2, wherein the two or more first segments is one group selected from: a first group of primary color segments, a second group of primary color segments and a white color segment, and a third group of primary color segments for right and left eyes respectively, and
wherein the two or more second segments is another group selected from the first group, second group and third group.

4. The light source system of claim 1, wherein the moving color device transmits the first light sequence and the second light sequence, and
wherein the light source system further comprises a first dichroic filter located between the excitation light source and the moving color device, the first dichroic filter transmitting the excitation light and reflecting the first light sequence and/or the second light sequence.

5. The light source system of claim 1, further comprising:
a second dichroic filter located on a side of the moving color device opposite the excitation light source, the second dichroic filter transmitting the first light sequence and/or the second light sequence at incident angles smaller than a predetermined angle and reflecting the first light sequence and/or the second light sequence at incident angles greater than the predetermined angle.

6. The light source system of claim 1, wherein at least some of the two or more first segments and/or at least some of the two or more second segments absorb the excitation light and generate converted lights with wavelength ranges different from a wavelength range of the excitation light.

7. The light source system of claim 6, wherein at least some of the two or more first segments and/or at least some of the two or more second segments transmit the excitation light.

8. The light source system of claim 1, wherein some of the two or more first segments transmit a first part of the first light sequence they generate, and some other ones of the two or more first segments reflect a second part of the first light sequence they generate, some of the two or more second segments transmit a first part of the second light sequence they generate, and some other ones of the two or more second segments reflect a second part of the second light sequence they generate; and wherein the light source system further includes a light combination device, which combines the first part of the first light sequence with the second part of the first light sequence and/or combines the first part of the second light sequence with the second part of the second light sequence.

9. The light source system of claim 1, wherein in the first working mode, the excitation light impinges on the first area, and the two or more first segments in the first area emit light to generate the first light sequence, and wherein in the second working mode, the excitation light impinges on the first area, and the two or more first segments in the first area emit light to generate the first light sequence, the first light sequence impinges on the second area, and the two or more second segments in the second area process the first light sequence to generate the second light sequence.

10. The light source system of claim 9, wherein the two or more first segments include primary color segments, and wherein the two or more second segments include primary color segments for right and left eyes respectively.

11. The light source system of claim 1, wherein moving color device further includes a third area, which includes two or more third segments, wherein in the first working mode, the excitation light impinges on the first area, the two or more first segments in the first area generate the first light sequence, and in the second working mode, the excitation light impinges on the third area, the two or more third segments in the third area generate a third light sequence, wherein the third light sequence impinges on the second area, the two or more second segments in the second area generate the second light sequence.

12. The light source system of claim 11, wherein the two or more first segments includes primary color segments and a white segment, the two or more second segments includes primary color segments for right and left eyes respectively, and the two or more third segments include primary color segments.

13. The light source system of claim 9, further comprising:

a reflective device, which reflects the first light sequence in the first working mode to a position outside of the moving color device or a light transmission area of the moving color device which transmit the first light sequence, and reflects the first light sequence or the third light sequence in the second working mode to the second area of the moving color device.

14. The light source system of claim 13, wherein the reflective device comprises an arc-shaped layer with an opening, wherein the excitation light impinges on the moving color device through the opening, and wherein the first light sequence or the third light sequence generated by moving color device is reflected by the arc-shaped layer.

15. The light source system of claim 1, wherein the switching device switches the working mode between the first working mode and the second working mode by moving the moving color device relative to the excitation light source.

16. The light source system of claim 1, wherein moving color device comprises a color wheel, which includes the first area and the second area.

17. The light source system of claim 1, wherein the first area and the second area are a first ring-shaped area and a second ring-shaped area concentric with each other, wherein the first ring-shaped area and the second ring-shaped rotate synchronously around a rotation axis as driven by the driving device, and wherein the two or more first segments locate along a circumferential direction in the first ring-shaped area and the two or more second segments locate along a circumferential direction in the second ring-shaped area.

* * * * *